July 21, 1953 M. L. SMALLEGAN 2,646,024
FEED LEVELER

Filed April 15, 1950 2 Sheets-Sheet 1

Inventor
Marvin L. Smallegan
By
Rice and Rice
Attorneys

July 21, 1953  M. L. SMALLEGAN  2,646,024
FEED LEVELER
Filed April 15, 1950  2 Sheets-Sheet 2
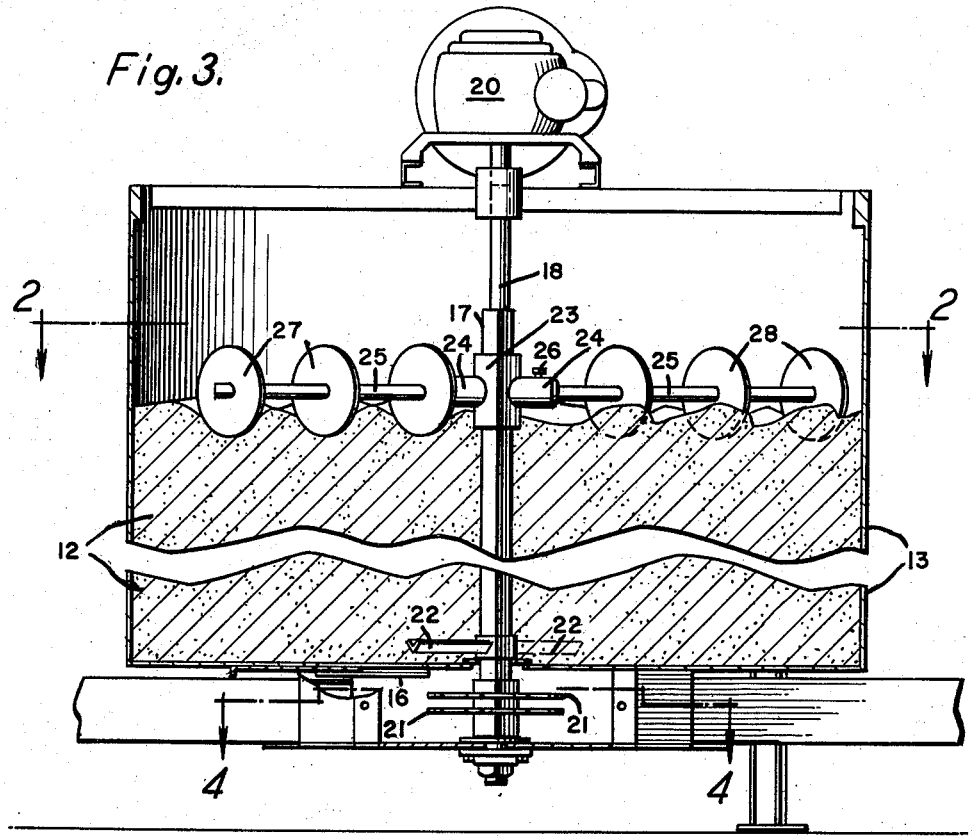
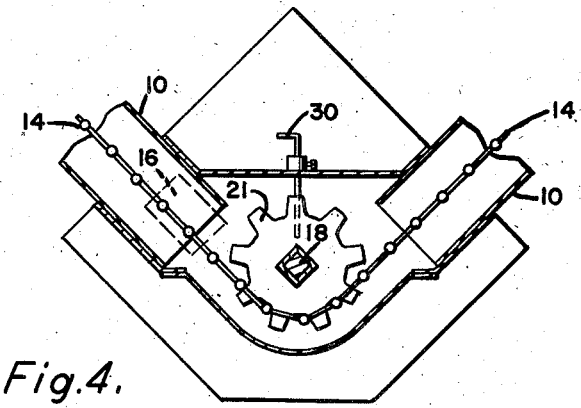
Inventor
Marvin L. Smallegan
By
Rice and Rice
Attorneys

UNITED STATES PATENT OFFICE 2,646,024

FEED LEVELER

Marvin L. Smallegan, Zeeland, Mich., assignor to Automatic Poultry Feeder Company, Zeeland, Mich, a corporation of Michigan Application April 15, 1950, Serial No. 156,110

2 Claims. (Cl. 119—52)

The present invention relates to feed levelers and more particularly to a device for leveling poultry feed at the top of a drum within which it has been placed and from which the feed falls by gravity into a feed trough.

The primary objects of the instant invention are to provide a device of the general character above indicated which maintains the poultry feed at an upper level while the feed therein falls by gravity therefrom into a poultry feed trough; to provide such a device which is highly efficient in its intended use; to provide such a device which is relatively simple in construction; and, to provide such a device which is reasonably economical in manufacture.

An illustrative embodiment of the invention is shown in the accompanying drawings, wherein:

Figure 3 is an enlarged fragmentary and central vertical sectional view of the feed drum and feed leveler on line 3—3 of Figure 2; and Figure 4 is a sectional view on line 4—4 of Figure 3.

Figure 2:
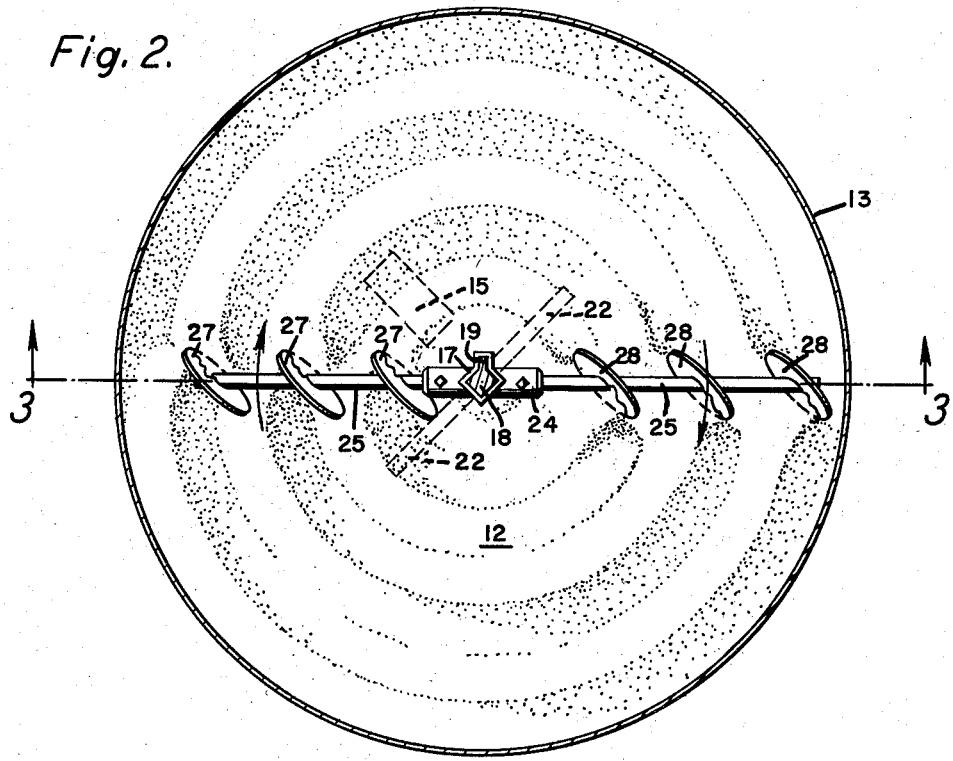
Figure 2 is an enlarged horizontal sectional view of the feed drum and the feed leveler on line 2—2 of Figure 3.
Figure 1:
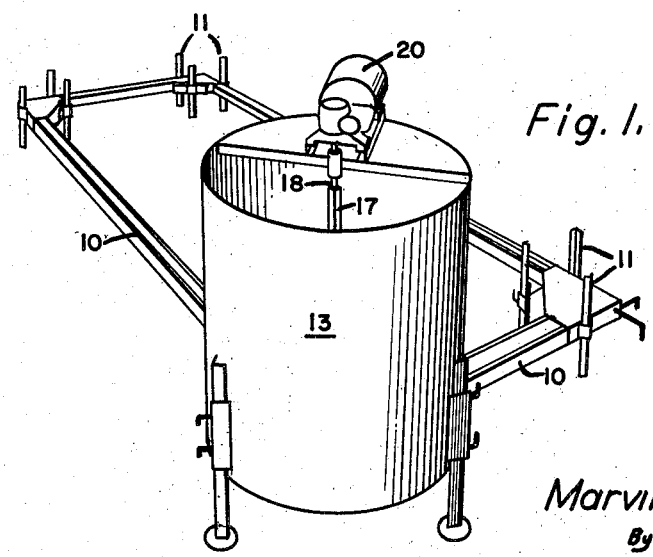
Figure 1 is a perspective view of a poultry feed trough in which feed fed thereto from a feed drum is conveyed by an endless belt conveyor but which feed in the drum is maintained at a level while being fed therefrom into the feed trough.

Referring then to the drawings wherein like parts of the structure shown are designated by the same numerals in the several views, a rectangular poultry feed trough 10 supported above the floor by spaced legs 11 is adapted to receive feed 12 from a drum 13 and be circulated in the trough by an endless belt conveyor such as the sprocket chain 14 (Fig. 4) whereby poultry standing about the trough may be fed when the feeder is in operation.

The drum 13 is provided with a rectangular opening 15 in its floor immediately above the feed trough 10 which opening may be manually adjustably opened by a slidably mounted gate 16 below the floor of the drum for regulating the amount of feed 12 flowing therefrom.

A squared rotatable shaft 18 having an integrally formed longitudinal spline 19 and disposed centrally vertically of the drum 13 is connected at its upper end to an electric motor 20 and at its lower end to a split sprocket wheel 21 on which the sprocket chain 14 is mounted and whereby it is caused to be travelled in the feed trough 10 to circulate the feed 12 admitted thereto through the opening 15 in the floor of the drum 13.

A squared tubular member 17 embraces the rotatable shaft 18, 19 for a considerable portion of its length and a V-shaped vane 22 is secured thereto at its lower end adjacent the floor of the drum for agitating the feed. A squared collar 23 vertically slidable on the member 17 above the vane 22 is provided on its opposite sides with a pair of transversely disposed sleeves 24.

A rod 25 is inserted and secured within each sleeve 24 in any suitable manner as by a set screw 26 and each rod is provided with a plurality of spaced angularly disposed disc vanes 27, 28, the disc vanes 27 being in staggered relation to the disc vanes 28, all as best viewed in Figures 2 and 3. A finger 30 (Fig. 4) has its shank projecting between the spaced inner walls of the split sprocket wheel 21 to free it of feed that may clog and foul its rotation.

Operation

To fill the drum 13 with feed 12, the operator lifts the squared collar 23 on the squared tubular member 17 to the top of the shaft 18, 19 and turns it slightly to permit it to rest on the upper end of the member 17. After the drum has been filled, the collar 23 is rotated to permit it to again slide on the member 17 thus allowing the rods 25 and their respective disc vanes 27, 28 to rest on the top of the feed as best shown in Figure 3.

When the motor 20 is started and the gate 16 has been opened to the desired extent, the sprocket chain 14 will thus be caused to be traveled in the feed trough 10 thus circulating the feed 12 therein and throughout its length and the disc vanes 27, 28 in their rotation will maintain the feed at a level in the upper end of the drum.

It will thus be seen that the feed leveler herein shown and described maintains the feed at an upper level while the feed therein falls by gravity therefrom into a poultry feed trough, that the device is highly efficient in its intended use, is relatively simple in construction, and is reasonably economical in manufacture.

While but one specific embodiment of the invention has been herein shown and described, it will be understood that certain details of the construction shown may be altered or omitted without departing from the spirit of the invention as the same is defined in the following claims.

I claim:

1. In a dispenser for dry, divided materials having a trough and a chain movable along said trough, a cylindrical hopper above said trough, the combination comprising: a vertical shaft extending through said trough and said hopper concentrically of said hopper; a sprocket on the lower end of said shaft adapted to engage said chain; a pair of rods mounted on said shaft for rotation therewith, said rods being slidable axially of said shaft; means for preventing rotation of said rods relative to said shaft; a plurality of spaced discs mounted on each of said rods, each of said discs being parallel and inclined in a horizontal plane to said rods, and of substantially greater diameter than said rods; an opening in said hopper adjacent said shaft and providing a passageway between said hopper and said trough; a pair of arms mounted on said shaft for rotation therewith within said hopper and adjacent said opening; means for rotating said shaft in the direction of the radially outwardly extending edges of said discs.

2. In a dispenser for dry, divided materials having a trough, a cylindrical hopper above said trough, the combination comprising: a vertical shaft extending through said trough and said hopper concentrically of said hopper; a pair of rods mounted on said shaft for rotation therewith, said rods being slidable axially of said shaft; means for preventing rotation of said rods relative to said shaft; a plurality of spaced discs mounted on each of said rods, each of said discs being parallel and inclined in a horizontal plane to said rods and of substantially greater diameter than said rods; an opening in said hopper adjacent said shaft and providing a passageway between said hopper and said trough; a pair of arms mounted on said shaft for rotation therewith within said hopper and adjacent said opening; means for rotating said shaft in the direction of the radially outwardly extending edges of said discs.

MARVIN L. SMALLEGAN.

References Cited in the file of this patent

UNITED STATES PATENTS

| Number | Name | Date |
|---|---|---|
| 512,906 | Root | Jan. 16, 1894 |
| 592,774 | Frazier | Nov. 2, 1897 |
| 670,581 | Erisman | Mar. 26, 1901 |
| 670,582 | Erisman | Mar. 26, 1901 |